United States Patent
Menezes et al.

Patent Number: 6,123,422
Date of Patent: Sep. 26, 2000

[54] METHODS FOR PRODUCING PROGRESSIVE ADDITION LENSES

[75] Inventors: Edgar V. Menezes, Roanoke; James S. Merritt, Troutville; William Kokonaski, Roanoke, all of Va.

[73] Assignee: Johnson & Johnson Vision Care, Inc., Jacksonville, Fla.

[21] Appl. No.: 09/315,477

[22] Filed: May 20, 1999

Related U.S. Application Data

[63] Continuation-in-part of application No. 09/178,471, Oct. 23, 1998.

[51] Int. Cl.[7] .............................. G02C 7/02; G02C 7/06; B29D 11/00

[52] U.S. Cl. ......................... 351/177; 351/169; 351/176; 264/1.8

[58] Field of Search ..................... 351/177, 176, 351/169, 168, 161–162, 160 R, 160 H, 159; 264/1.8

[56] References Cited

U.S. PATENT DOCUMENTS

| | | | |
|---|---|---|---|
| 3,711,191 | 1/1973 | Tagnon | 351/169 |
| 4,055,379 | 10/1977 | Winthrop | 351/171 |
| 4,056,311 | 11/1977 | Winhrop | 351/169 |
| 4,062,629 | 12/1977 | Wnthrop | 351/169 |
| 4,253,747 | 3/1981 | Maitenaz | 351/169 |
| 4,461,550 | 7/1984 | Legendre | 351/169 |
| 4,806,010 | 2/1989 | Ewer et al. | 351/169 |
| 4,859,261 | 8/1989 | Ace | 156/102 |
| 4,906,090 | 3/1990 | Barth | 351/169 |
| 4,946,270 | 8/1990 | Guilino et al. | 351/169 |
| 4,952,048 | 8/1990 | Frieder et al. | 351/177 |
| 5,178,800 | 1/1993 | Blum | 264/1.38 |
| 5,219,497 | 6/1993 | Blum | 264/1.38 |
| 5,305,028 | 4/1994 | Okano | 351/169 |
| 5,771,089 | 6/1998 | Barth | 351/169 |
| 5,793,465 | 8/1998 | Gupta et al. | 351/161 |
| 5,844,657 | 12/1998 | Shirayanagi | 351/169 |

FOREIGN PATENT DOCUMENTS

| | | |
|---|---|---|
| 191831 B1 | 1/1989 | European Pat. Off. . |
| 0 578 833 A1 | 2/1993 | European Pat. Off. . |
| 0 809 126 A1 | 1/1997 | European Pat. Off. . |
| 0 414 890 B1 | 1/1998 | European Pat. Off. . |
| 857 993 A2 | 8/1998 | European Pat. Off. . |
| 63254415 | 10/1988 | Japan . |
| 05303063 | 1/1993 | Japan . |
| 775007 | 5/1957 | United Kingdom . |
| WO 98/12591 | 3/1998 | WIPO . |
| WO 98/22848 | 5/1998 | WIPO . |

*Primary Examiner*—Scott J. Sugarman
*Assistant Examiner*—Jordan M. Schwartz
*Attorney, Agent, or Firm*—Lois Gianneschi

[57] ABSTRACT

The invention provides progressive addition lenses in which lens unwanted astigmatism is reduced and channel width through the intermediate and near vision zones is increased as compared to conventional progressive addition lenses. This result is achieved by combining two or more progressive addition surfaces, which surfaces in combination provide the dioptric add power of the lens.

32 Claims, 3 Drawing Sheets

METHODS FOR PRODUCING PROGRESSIVE ADDITION LENSES

This is a Continuation-in-Part (CIP) of prior application Ser. No. 09/178,471, filed Oct. 23, 1998.

FIELD OF THE INVENTION

The present invention relates to multifocal ophthalmic lenses. In particular, the invention provides progressive addition lenses in which unwanted lens astigmatism is reduced without functional compromise of the distance and channel widths through the intermediate and near vision zones, as compared to conventional progressive addition lenses.

BACKGROUND OF THE INVENTION

The use of ophthalmic lenses for the correction of ametropia is well known. For example, multifocal lenses, such as progressive addition lenses ("PAL's"), are used for the treatment of presbyopia. The surface of a PAL provides far, intermediate, and near vision in a gradual, continuous progression of vertically increasing dioptric power from far to near focus, or top to bottom of the lens.

PAL's are appealing to the wearer because PAL's are free of the visible ledges between the zones of differing dioptric power that are found in other multifocal lenses, such as bifocals and trifocals. However, an inherent disadvantage in PAL's is unwanted lens astigmatism, or astigmatism introduced or caused by one or more of the lens' surfaces. Generally, the unwanted lens astigmatism is located on either side of the near vision zone of the lens and, at or near its approximate center, reaches a maximum level that corresponds approximately to the near vision dioptric add power of the lens.

Generally, a PAL with a 2.00 diopter add power and 15 mm channel length will have about a 2.00 diopter maximum, localized unwanted astigmatism. The channel width of the lens will be approximately 6 mm in which the unwanted astigmatism is less than or equal to a 0.75 diopter threshold value.

Any number of lens designs have been tried in attempting to either or both reduce unwanted astigmatism or increase the minimum channel width. However, current state-of-the-art progressive addition lenses provide only minimal decreases in unwanted astigmatism while having large areas in the lenses' peripheries that are unusable due to unwanted astigmatism. Thus, a need exists for a PAL that reduces maximum, localized unwanted astigmatism and, at the same time, provides an increase in the minimum channel width.

BRIEF DESCRIPTION OF THE DRAWINGS

FIG. 1b is an astigmatism map of the lens of FIG. 1a.

FIG. 2b is an astigmatism map of the lens of FIG. 2a.

FIG. 4b is an astigmatism map of the lens of FIG. 4a.

FIG. 5b is an astigmatism map of a progressive surface of the lens of FIG. 5a.

FIG. 5c is an astigmatism map of a progressive surface of the lens of FIG. 5a.

FIG. 5d is an astigmatism map of the lens of FIG. 5a.

DESCRIPTION OF THE INVENTION AND ITS PREFERRED EMBODIMENTS

Figure 1A:
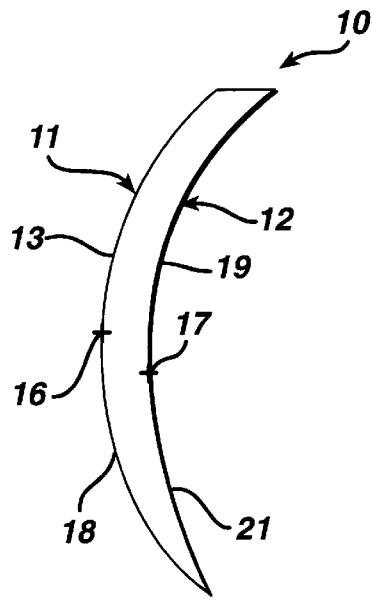
FIG. 1a is a side view of a lens of the invention.

The present invention provides progressive addition lenses, as well as methods for their design and production, in which the maximum, localized unwanted astigmatism that is associated with a given dioptric add power is reduced compared to prior art lenses. Additionally, the distance width, or width about the optical center of the lens that is free of about 0.50 diopters or more of unwanted astigmatism, and minimum channel width of the lens is suitable for use by the lens wearer.

For purposes of the invention, by "channel" is meant the corridor of vision that is free of astigmatism of about 0.75 diopters or greater when the wearer's eye is scanning from the distance zone to the near zone and back. By "lens" or "lenses" is meant any ophthalmic lens including, without limitation, spectacle lenses, contact lenses, intraocular lenses and the like. Preferably, the lens of the invention is a spectacle lens.

It is one discovery of the invention that maximum, localized astigmatism may be reduced by combining two or more progressive addition surfaces each providing a dioptric add power that combines with that of the other surface or surfaces to produce a lens of a higher dioptric add power than that of the surfaces individually. By "dioptric add power" is meant the amount of dioptric power difference between the near and far vision zones of a progressive addition surface. The lens of the invention exhibits less maximum, localized unwanted astigmatism and a wider channel than would be expected by producing a lens with the same dioptric add power using only a single progressive addition surface. Further, it is a discovery of the invention that the use of more than one progressive addition surface ensures that the distance dioptric power and the total dioptric add power needed to correct the wearer's vision are uncompromised. It is yet another discovery of the invention that when the progressive surfaces' dioptric add power areas are misaligned with respect to one another, the resultant total maximum, localized unwanted astigmatism of the lens is less than the sum of the maximum, localized unwanted astigmatism contributed by the individual dioptric add powers of each progressive addition surface.

By "progressive addition surface" is meant a continuous, aspheric surface having far and near vision zones and a zone of increasing dioptric power connecting the far and near vision zones. By "maximum, localized unwanted astigmatism" is meant the highest, measurable level of astigmatism in an area of unwanted astigmatism on a lens surface.

In one embodiment, the lens of the invention comprises, consists essentially of, and consists of: a.) a first progressive addition surface having one or more areas of maximum, localized unwanted astigmatism and a first dioptric add power; and b.) a second progressive addition surface having one or more areas of maximum, localized unwanted astigmatism and a second dioptric add power, the progressive addition surfaces disposed in relation to each other so that a portion or all of the areas of maximum, localized unwanted astigmatism are misaligned and wherein the dioptric add power of the lens is the sum of the first and second dioptric add powers.

In another embodiment, the invention provides a process for producing a lens comprising, consisting essentially of, and consisting of the steps of: a.) providing at least a first and a second progressive addition surface, the first progressive addition surface having one or more areas of maximum, localized unwanted astigmatism and a first dioptric add power and the second progressive addition surface having one or more areas of maximum, localized unwanted astigmatism and a second dioptric add power; and b.) disposing the first and second progressive addition surfaces so that a portion or all of the areas of maximum, localized unwanted astigmatism are misaligned and the dioptric add power of the lens is the sum of the first and second dioptric add powers.

By "misaligned" is meant that the surfaces, and thus the areas of unwanted astigmatism, are arranged or disposed in relation to one another so that a portion or all of the areas of maximum, localized unwanted astigmatism of one surface do not substantially coincide with one or more areas of maximum, localized unwanted astigmatism of the other surface. Preferably, the misalignment is such that no area of maximum, localized unwanted astigmatism of a surface substantially coincides with that of the other surface.

The progressive addition surfaces used in the lens of the invention may be misaligned by any of a number of methods. For example, the optical centers of the surfaces may be shifted either or both laterally or vertically with respect to each other. By "optical center" is meant the point on a surface intersected by the optical axis of the lens. One ordinarily skilled in the art will recognize that, if the optical centers are shifted laterally, the minimum channel width is reduced by the extent of the shift. Thus, a progressive addition lens design using a lateral shift preferably uses progressive addition surfaces with wider channel widths to compensate for the diminution in channel width caused by the shift.

Alternatively, if the optical centers of the surfaces are shifted vertically, the channel length will be increased. By "channel length is meant the distance along the central meridian of the surface between the optical center and the top end of the near vision zone. Thus, a design using such a shift preferably uses progressive addition surfaces with shorter channel lengths in compensation.

As yet another alternative, maintaining the optical centers of the progressive surfaces coincident with each other, the centers may be rotated with respect to one another. In a preferred embodiment, each surface is designed so that it is asymmetric about the center line of its channel. In this case, the areas of maximum, localized unwanted astigmatism of the surfaces do not substantially coincide on rotation of the optics about an axis joining the surfaces' optical centers. By "asymmetric" is meant that the power and astigmatism maps of the surface are asymmetric about the center meridian of the surface.

The lateral and vertical shifts are done in such a way as to preserve the distance and near vision dioptric powers of the lens. In order to minimize the introduction of lens prism power, the shifts must occur so that the optical center of one progressive addition surface is shifted along a curve that is parallel to the distance curve of the other progressive addition surface. In the case of rotations, the surfaces are rotated about their optical centers so that the distance and near powers are substantially unaffected. One ordinarily skilled in the art will recognize that the rotational misalignment may be in addition to the misalignment carried out for purposes of reducing unwanted astigmatism.

The amount of misalignment, or the vertical shift, lateral shift or rotation of optical centers, is an amount sufficient to prevent substantial superposition, or coincidence, of the maximum, localized unwanted astigmatism areas of the progressive addition surfaces. More specifically, it is believed that the misalignment leads to a mismatch of the direction of the astigmatic vectors associated with one surface relative to the corresponding astigmatic vectors of the other surface resulting in the total maximum, localized unwanted astigmatism for the final lens being less than that if the vectors were aligned. The lateral or vertical shift may be about 0.1 mm to about 10 mm, preferably about 1.0 mm to about 8 mm, more preferably about 2.0 mm to about 4.0 mm. Rotational shifts may be about 1 to about 40 degrees, preferably about 5 to about 30 degrees, more preferably about 10 to about 20 degrees.

As yet another alternative for misalignment, each surface may be designed so that the channel length of the surfaces are of different lengths. In this embodiment, the areas of maximum, localized, unwanted astigmatism of the surfaces do not align when the optical centers of the surfaces are brought into alignment. As a result, the unwanted astigmatism is reduced compared to a lens of the same total dioptric add power. The greater the difference between the channel lengths, the greater will be the reduction in maximum, localized unwanted astigmatism. However, the channel lengths must not be so large as to produce a mismatch in the near vision zones so that the near vision of the lens wearer is compromised. The lens resulting from this embodiment will have a channel length falling between that of each surface and dependent upon the dioptric add power contributed by each surface to the total dioptric add power of the lens. The channel length difference between the surfaces may be about 0.1 mm to about 10 mm, preferably about 1 mm to about 7 mm, more preferably about 2 mm to about 5 mm.

The progressive addition surfaces may each be independently on the convex or concave surface of the lens or in a layer between the outer concave and outer convex surfaces of the lens. Other surfaces, such as spheric and toric surfaces, designed to adapt the lens to the ophthalmic prescription of the lens' wearer may be used in combination with, or in addition to, one or more of the progressive addition surfaces.

For example, one of the progressive addition surfaces, preferably a concave surface, may be combined with a toric surface to provide a toric progressive surface having a dioptric add power and a cylinder power at a particular axis. In the case of a concave, toric progressive surface, the convex surface preferably is a non-toric surface.

In order to both provide the desired dioptric add power and correct for the lens wearer's astigmatism, each of the surfaces' near vision zones may be aligned with the wearer's pupil location during near viewing and the cylinder axis of the toric progressive surface placed so as to correspond to the wearer's prescription. However, this method necessitates that a toric progressive surface be provided at each of the possible 180 degree cylinder axes orientations to provide a full prescriptive range of lenses. It is yet another discovery of this invention that the dioptric add power decreases slowly moving horizontally away from the center of the near vision zone to the surface's periphery. Given this fact, a rotational misalignment of the surfaces' near vision zones of about + or − about 1 to about 25, preferably + or − about 1 to about 15, more preferably + or − about 1 to about 13 degrees may be used while achieving the desired lens dioptric add power. This discovery permits limiting the number of cylinder axis and near vision zone positions used so that a toric progressive surface need not be provided at each cylinder axis degree.

More specifically, a preferred process for producing a lens with a toric progressive surface is as follows. An optical preform is selected, the preform having a concave surface with a predetermined cylinder power, predetermined cylinder axis, and predetermined near vision zone location. By "optical preform" or "preform" is meant a shaped, optically transparent article capable of refracting light and possessing a convex and a concave surface, which article is suitable for use in producing a spectacle lens. The cylinder power preferably is the power required by the lens wearer. The predetermined cylinder axis may be any cylinder axis, but preferably is within a set number of degrees of the lens wearer's required cylinder axis. The preform cylinder axis may be within about 0 to about 25 degrees, preferably about 0 to about 20 degrees, more preferably about 0 about 11 degrees of the required cylinder axis desired for the lens' wearer. Preferably, the cylinder axis orientation selected is one of a group of orientations that is less than the 180 possible orientations, more preferably the axis being one of a group of about 20 orientations, most preferably the orientation is +11.25, +33.75, +56.25, +78.75, +101.25, +123.75, +146.25, and +168.75 degrees relative to the three o'clock position on the preform.

The preform's concave surface near vision zone may be provided at any convenient position, but preferably is located so that its center is along the 270 degree axis of the preform. In a more preferred embodiment, preform cylinder axes are provided at +11.25, +33.75, +56.25, +78.75, +101.25, +123.75, +146.25, or +168.75 degrees relative to the three o'clock position on the preform and the near vision zone center is located along the 270 degree axis, the six o'clock position.

A convex surface is provided for the lens by using a mold suitable for casting the surface onto the preform. Preferably, the mold is suitable for the casting of a progressive surface. The mold near vision zone may be provided at any convenient position but preferably is at a position that is aligned with the near viewing pupil position of the lens wearer. Typically, this position will be on either side of the 270 degree axis, the 6 o'clock position, of the mold depending on whether the left or right lens is being fabricated. Preferably, the position is within about 0 to about 20, more preferably about 5 to about 15, most preferably about 8 to about 10 degrees on either side of the 270 degree axis.

The selected preform is positioned, or rotated, in relation to the mold selected so that the cylinder axis of the resulting lens will be that required by the lens wearer. For example, if the lens wearer's required cylinder axis is 180 degrees for the left eye and the optical preform cylinder power is at the 11.25 degree axis, with the near vision zone at 270 degrees, the preform is rotated so that its cylinder axis falls along the mold's 180 degree axis. This aligns the cylinder axis of the preform to the wearer's required cylinder axis. It will be recognized that the rotation of the preform in relation to the mold also produces a rotational misalignment of the preform and mold near vision zones. However, this rotational misalignment is tolerable up to about + or −25 degrees for purposes of achieving the desired lens dioptric add power.

Thus, in yet another embodiment, the invention provides a process for producing a progressive addition lens for a lens wearer, and lenses produced by the process, comprising, consisting essentially of and consisting of: a.) providing an optical preform comprising at least one surface having a predetermined first cylinder axis, a predetermined cylinder power, and a predetermined first near vision zone position; b.) providing a mold for casting a surface onto the optical preform, the mold comprising a second near vision zone position that is aligned with the lens wearer's near viewing pupil location; and c.) positioning the preform in relation to the mold in order to provide the resulting lens with a cylinder axis desired for the lens wearer.

In an alternative embodiment of the process, an optical preform is provided with at least one surface, preferably the convex surface, having a near vision zone, preferably a progressive addition surface. The near vision zone of this surface is aligned with the lens wearer's near viewing pupil location. A mold suitable for casting a toric surface onto the preform is used, the mold having a predetermined cylinder axis, cylinder power, and near vision zone location as above-described. Thus, in an alternative embodiment, a process is provided for producing a progressive addition lens for a lens wearer, and lenses produced by the process, comprising, consisting essentially of and consisting of: a.) providing an optical preform comprising at least one surface having a first near vision zone position that is aligned with the lens wearer's near viewing pupil location; b.) providing a mold for casting a surface onto the optical preform, the mold comprising a predetermined first cylinder axis, predetermined a cylinder power, and a predetermined second near vision zone position; and c.) positioning the preform in relation to the mold in order to provide the resulting lens with a cylinder axis desired for the lens wearer.

One ordinarily skilled in the art will recognize that any number of a wide variety of predetermined cylinder axes and near vision zone placements may be used. However, it is preferred that the predetermined cylinder axes and near vision zone placements be selected from those shown on Table 1 for the listed lens cylinder axis prescription requirements.

TABLE 1

| Cylinder Axis (°); Near Vision Zone Location | Left Lens Cylinder Axis Required (°) | Right Lens Cylinder Axis Required (°) |
| --- | --- | --- |
| 11.25; 270 degrees | 1–14 and 173–180 | 8–30 |
| 33.75; 270 degrees | 15–37 | 31–53 |
| 56.25; 270 degrees | 38–59 | 54–75 |
| 78.75; 270 degrees | 60–82 | 76–98 |
| 101.25; 270 degrees | 83–104 | 99–120 |
| 123.75; 270 degrees | 105–127 | 121–143 |
| 146.25; 270 degrees | 128–149 | 144–165 |
| 168.75; 270 degrees | 150–172 | 166–180 and 1–7 |

For the lenses and processes of the invention, the dioptric add power of each of the progressive addition surfaces used in the invention is selected so that the sum of their dioptric add powers is substantially equal to the value needed to correct the lens wearer's near vision acuity. Additionally, the dioptric add power of each surface is selected in view of the maximum, localized unwanted astigmatism associated with a given near dioptric power. The dioptric add power of the progressive addition surfaces may be each independently from about +0.01 diopters to about +3.00 diopters, preferably from about +0.25 diopters to about +2.00 diopters, more preferably about +0.50 to about +1.50 diopters.

Similarly, the distance and near dioptric powers for each surface are selected so that the sum of the powers is the value needed to correct the wearer's distance and near vision. Generally, the distance dioptric power for each surface will be within the range of about 0.25 diopters to about 8.50 diopters. Preferably, the dioptric power of the distance zone of the concave surface may be + or − about 2.00 to about 5.50 diopters and for the convex surface, + or − about 0.5 to about 8.00 diopters. The near vision dioptric power for each of the surfaces will be about 1.00 diopters to about 12.00 diopters. In those embodiments in which a cylinder power is used, the cylinder power may be about −0.125 to about −6.00 diopters, preferably about −0.25 to about −3.00 diopters.

The progressive addition surfaces and lenses of the invention may be formed by any convenient method such as, without limitation, thermoforming, molding, grinding, casting or the like. In a preferred method, an optical preform having a progressive addition surface is used and a second progressive addition surface is cast onto the preform. In a more preferred method, a preform the concave surface of which is a progressive addition surface with a base spherical power and a cylinder power is used and a progressive addition surface is formed on the front surface by any convenient method, preferably by casting and more preferably by surface casting.

The invention will be clarified further by a consideration of the following, non-limiting examples.

EXAMPLES

Example 1

Referring to FIG. 1a, lens 10 of the invention is shown having convex progressive addition surface 11 and concave progressive addition surface 12. Surface 11 has distance zone 13 with a curvature of 6.00 diopters and near zone 18 with a curvature of 7.00 diopters. Surface 12 has distance zone 19 with a curvature of 6.00 diopters and near zone 21 with a curvature of 5.00 diopters. The resulting distance power of the lens is 0.00 diopters and the dioptric add power of the lens is 2.00 diopters, 1.00 diopters contributed by each of surfaces 11 and 12. As shown in FIG. 1a, the convex and concave optical centers 16 and 17, respectively, are shifted with respect to each other by 4.0 mm.

Figure 1B:
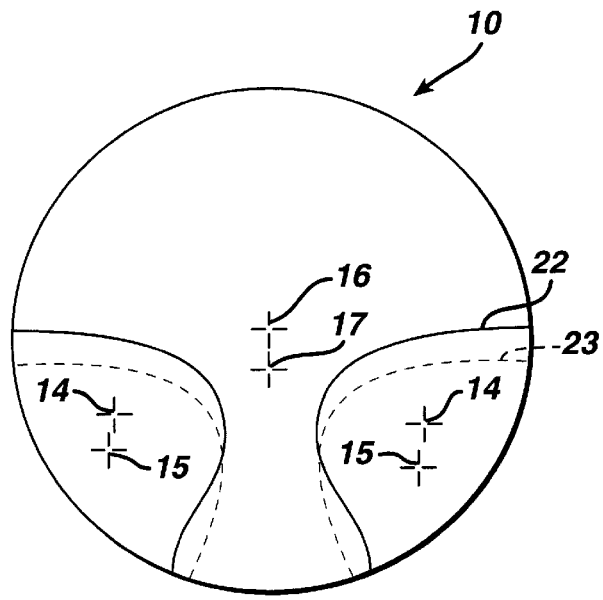

FIG. 1b is an astigmatism map of lens 10 illustrating the misalignment of the surfaces. Areas 22 and 23 are of the unwanted astigmatism for surfaces 11 and 12, respectively. The locations of the maximum, localized astigmatism 14 and 15 do not overlap and, thus, are not additive. The maximum, localized unwanted astigmatism value of 1.90 D for this lens is shown in Table 1 and is significantly lower than the 2.20 D that is found in a conventional PAL of the same near dioptric power.

TABLE 1

| Example | Add Power Front (D) | Add Power Back (D) | Add Power Total (D) | Vertical Shift (mm) | Max. Astigmatism (D) | Max. Astig./Add Ratio |
|---|---|---|---|---|---|---|
| Prior Art | 2.00 | 0.00 | 2.00 | 0.0 | 2.20 | 1.10 |
| 1 | 1.05 | 1.05 | 2.10 | 4.0 | 1.90 | 0.90 |
| 2 | 1.05 | 1.05 | 2.10 | 8.0 | 1.90 | 0.90 |

Example 2

A lens with two progressive addition surfaces is used, the misalignment for which is 8.00 mm. The misalignment results in a reduction of maximum localized u unwanted astigmatism of 0.30 D compared to the prior art Lens of Table 1.

Example 3

Figure 2A:
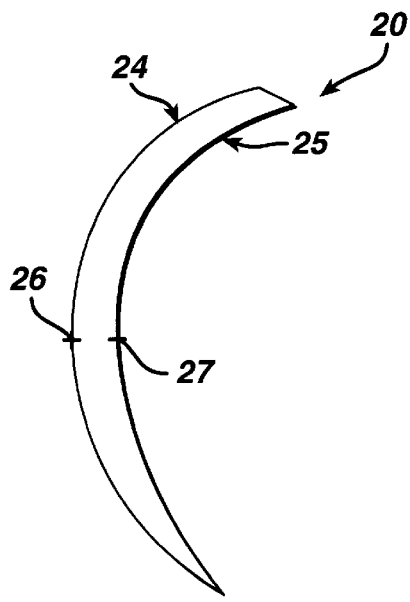
FIG. 2a is a side view of a lens of the invention.
Figure 2B:
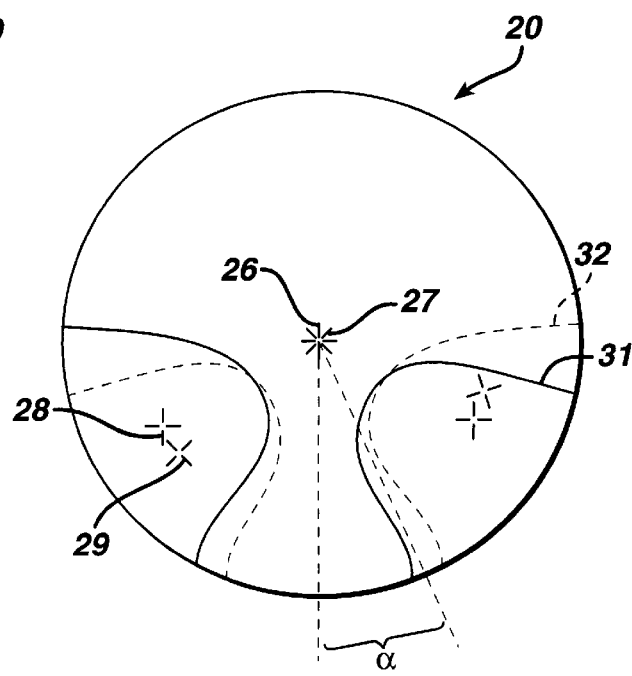

As shown in FIGS. 2a and 2b, lens 20 with a concave progressive addition surface 25 is seen. Surface 25 has distance and near zone curvatures of 6.00 and 5.00 diopters, respectively. Convex surface 24 with distance and near zone curvatures of 6.00 and 7.00 diopters is also shown. The optical center 27 of surface 25 is rotated by α, an amount of 10 degrees, with respect to that of optical center 26 of convex progressive surface 24. In FIG. 2b, the astigmatism map of lens 20 is shown. Areas 31 and 32 depict the areas of unwanted astigmatism for surfaces 24 and 25, respectively. Maximum, localized unwanted astigmatism areas 28 and 29 for surfaces 24 and 25, respectively, are also shown. Table 2 shows that the resulting lens has a maximum, localized unwanted astigmatism of 1.90 diopters as compared to 2.10 diopters for a prior art lens.

TABLE 2

| Example | Add Power Front (D) | Add Power Back (D) | Add Power Total (D) | Rotational Shift (deg.) | Max. Astigmatism (D) | Max. Astig./Add Ratio |
|---|---|---|---|---|---|---|
| Prior Art | 2.00 | 0.00 | 2.00 | 0.0 | 2.20 | 1.10 |
| 3 | 1.00 | 1.00 | 1.90 | 10.0 | 1.90 | 1.00 |
| 4 | 1.00 | 1.00 | 1.95 | 20.0 | 1.85 | 0.95 |
| 5 | 1.00 | 1.00 | 1.85 | 30.0 | 1.75 | 0.95 |
| 6 | 1.00 | 1.00 | 1.85 | 40.0 | 1.41 | 0.76 |

Examples 4–6

The concave progressive addition surface of a lens is rotated around its optical center by 20, 30, and 40 degrees with respect to the convex progressive addition surface. The rotations result in maximum, localized unwanted astigmatisms of 1.85, 1.75, and 1.41 diopters, respectively as listed on Table 2.

Example 7

Figure 3:
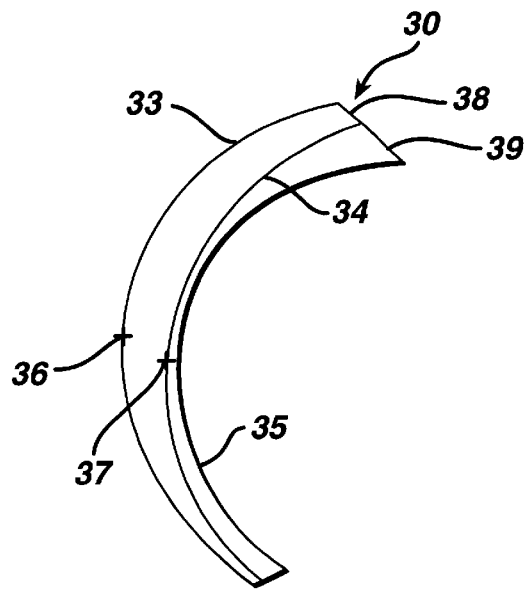
FIG. 3 is a side view of a lens of the invention.

FIG. 3 depicts a concave progressive addition surface 34 placed between surfaces 33 and 35 of lens 30. Lens 30 is made of an optical preform 38 having a refractive index of 1.60 and a cast layer 39 having a refractive index of 1.50. Convex surface 33 of preform 38 has optical center 36, a distance curvature of 6.50 diopters and a near curvature of 8.50 diopters. Concave surface 34 of preform 38 has optical center 37, a distance curvature ("DC") of 6.50 diopters and a near curvature ("NC") of 0.50 diopters derived by the formula:

$$NC = DC - \text{add power} \times \frac{n_1 - 1.00}{n_1 - n_2}$$

wherein $n_1$ is the refractive index of optical preform 38 and $n_2$ is the refractive index of layer 39. Optical center 37 is shifted vertically downwards 4 mm with respect to optical center 36. Concave surface 35 of layer 39 includes a cylindrical power of −2.00 D for correcting the wearer's astigmatism. Lens 30 has a distance power of 0.00 diopters, a total dioptric add power of 3.00 diopters, arrived at by the 2.00 diopter dioptric add power of surface 33 and the 1.00 diopters dioptric add power of surface 34 combined. The maximum, localized unwanted astigmatism is lower than that of a conventional lens with a 3.00 diopters dioptric add power.

Example 8

Figure 4A:
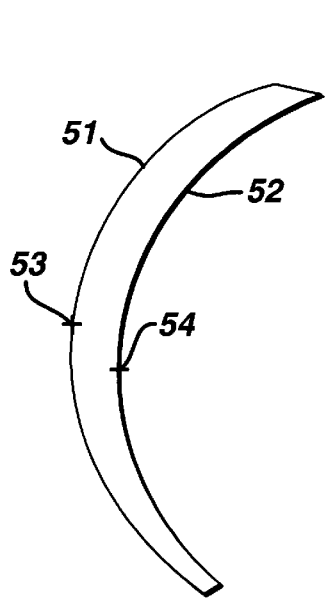
FIG. 4a is a side view of the lens of the invention.
Figure 4B:
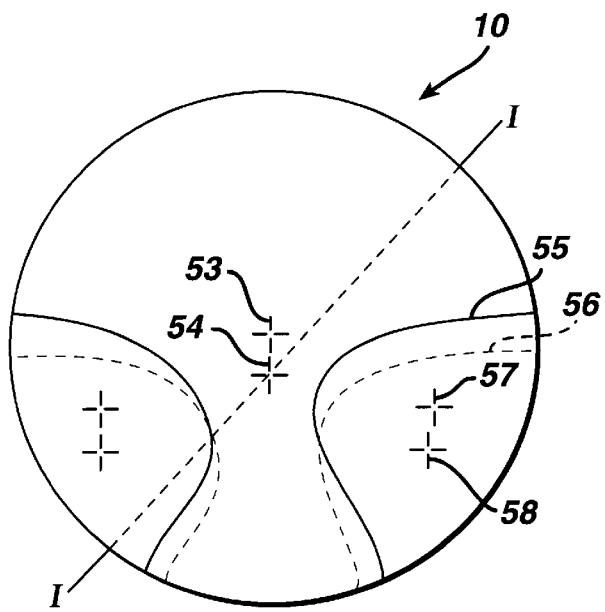

In FIG. 4a is depicted lens 50 having convex surface 51 and concave surface 52. Surface 51 is a progressive addition surface with optical center 53. Surface 52 is a combination progressive addition-toric surface having optical center 54 shifted vertically downwards 4 mm with respect to optical center 53. FIG. 4b depicts the astigmatism map for lens 50 showing the shift. Areas 55 and 56 are the areas of unwanted astigmatism, 57 and 58 being their respective maximum, localized unwanted astigmatism areas respectively, for surfaces 51 and 52. I—I is the toric axis for surface 52. The overlap of the progressive addition surfaces are such that, although the near and distance vision zones are preserved, the location of the maximum, localized unwanted astigmatisms 57 and 58 of each surface do not coincide and, thus, their effect is not additive.

Example 9

Figure 5A:
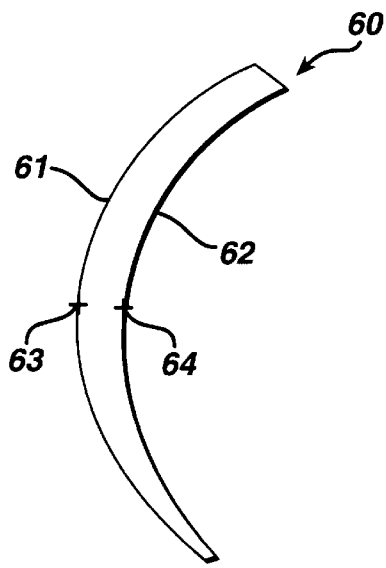
FIG. 5a is a side view of a lens of the invention.
Figure 5D:
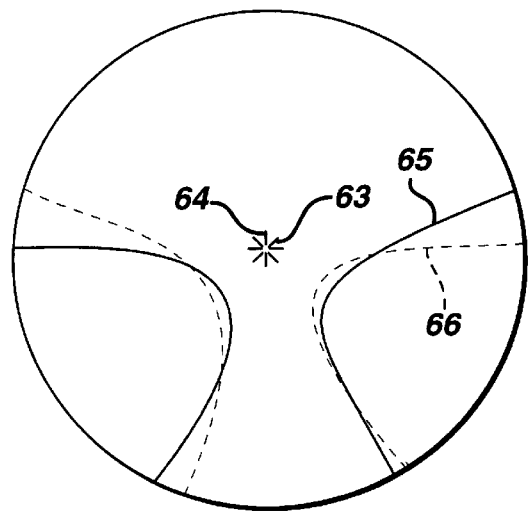
Figure 5B:
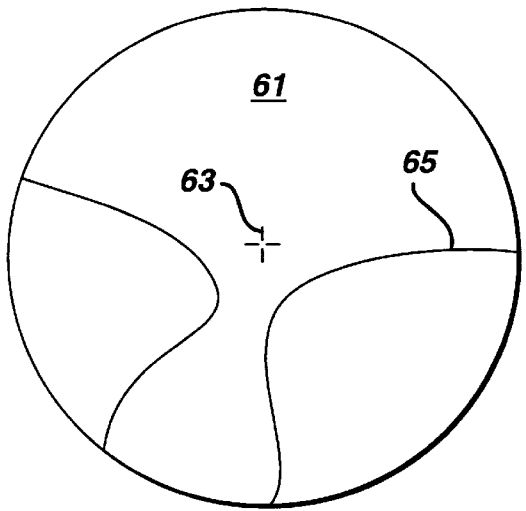
Figure 5C:
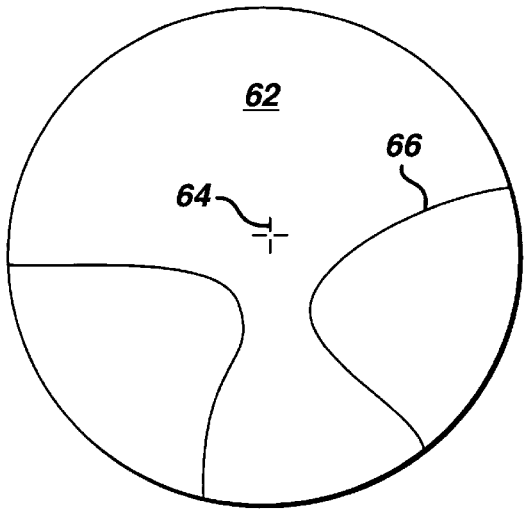

Lens 60 is depicted in FIG. 5a in which a left oriented, convex progressive addition surface 61 shown combined with a right oriented, concave progressive addition surface 62. Each surface is depicted individually in FIGS. 5b and 5c, respectively. Optical centers 63 and 64 of each surface are rotated so as to become optically aligned. In FIG. 5d is depicted that the left and right orientation of the surfaces provides misalignment of the unwanted astigmatism areas 65 and 66 of surfaces 61 and 62, respectively. The maximum, localized unwanted astigmatism for lens 60 of 1.70 diopters listed on Table 3.

TABLE 3

| Example | Add Power Front (D) | Add Power Back (D) | Add Power Total (D) | Max. Astigmatism (D) | Max. Astig./Add Ratio |
|---|---|---|---|---|---|
| Prior Art | 2.02 | 0.00 | 2.02 | 2.20 | 1.10 |
| 9 | 1.00L | 1.00R | 2.10 | 1.70 | 0.81 |

Example 10

An optical preform is produced containing a spherical, convex surface with a curvature of 6.00 diopters. The preform concave surface is a toric-progressive surface with a base spherical curvature of 6.00 diopters, a cylinder power of −2.00 diopters at an axis of 11.25 degrees, and near vision zone with a dioptric add power of 1.00 diopters. The near vision zone is centered along the 270 degree axis of the preform. A progressive addition glass mold for a left lens is provided to surface cast a UV curable resin layer onto the convex surface of the preform using conventional surface casting techniques. The mold has a 6.00 diopter base curvature and a 1.00 dioptric add power with the near vision zone along the 262 degree axis of the mold (8 degrees counterclockwise from the vertical). The preform is rotated counterclockwise, relative to the glass mold 11.25 degrees so that the cylinder axis falls at the mold's 0 degrees axis, the axis desired for the lens. The rotational misalignment of the concave surface and convex surface near vision zones will be 11.25−8=3.25 degrees. The resultant lens has a distance power of 0.00 diopters, a cylinder power of −2.00 diopters at 0 degree axis, and a dioptric add power of 2.00 diopters.

What is claimed is:

1. A process for producing a progressive addition lens for a lens wearer comprising the steps of: a.) providing an optical preform comprising at least one surface having a predetermined first cylinder axis, a predetermined cylinder power, and a predetermined first near vision zone position; b.) providing a mold for casting a surface onto the optical preform, the mold comprising a second near vision zone that is aligned with the lens wearer's near viewing pupil location; and c.) positioning the preform in relation to the mold in order to provide the resulting lens with a cylinder axis desired for the lens wearer.

2. A process for producing a progressive addition lens for a lens wearer comprising the steps of: a.) providing an optical preform comprising at least one surface having a first near vision zone position that is aligned with the lens wearer's near viewing pupil location; b.) providing a mold for casting a surface onto the optical preform, the mold comprising a predetermined first cylinder axis, a predetermined cylinder power, and a predetermined second near vision zone position; and c.) positioning the preform in relation to the mold in order to provide the resulting lens with a cylinder axis desired for the lens wearer.

3. The process of claims 1 or 2, wherein the mold is a mold suitable for casting a progressive addition surface onto the preform.

4. The process of claim 1, wherein the optical preform cylinder axis is within about 0 to about 25 degrees of the lens' wearer's cylinder axis.

5. The process of claim 1, wherein the optical preform surface is the concave surface.

6. The process of claim 2, wherein the optical preform surface is the convex surface.

7. The process of claim 1, wherein the optical preform surface's near vision zone is located so that its center is along the 270 degree axis of the preform.

8. The process of claim 1, wherein the optical preform cylinder axis is provided is one of a group that is less than the 180 possible axis orientations.

9. The process of claim 1, wherein the optical preform cylinder axis is provided at one of +11.25, +33.75, +56.25, +78.75, +101.25, +123.75, +146.25, or +168.75 degrees relative to the three o'clock position on the optical preform.

10. The process of claim 8, wherein the optical preform surface's near vision zone center is located along the 270 degree axis of the optical preform.

11. The process of claim 9, wherein the optical preform surface's near vision zone center is located along the 270 degree axis of the optical preform.

12. The process of claim 1, wherein the cast layer is cast onto the convex surface of the optical preform.

13. The process of claim 1, wherein the mold near vision zone is at a position that is on either side of the 270 degree axis of the mold.

14. The process of claim 13, wherein the near vision zone position is within about 0 to about 20 degrees of the 270 degree axis.

15. A process for producing a progressive addition lens for a lens wearer comprising the steps of: a.) providing an optical preform comprising a concave surface having a predetermined first cylinder axis, a predetermined cylinder power and a predetermined first near vision zone position; b.) providing a mold for casting a surface onto the optical preform's convex surface, the mold comprising a second near vision zone that is aligned with the lens wearer's near viewing pupil location; and c.) positioning the preform in relation to the mold in order to provide the resulting lens with a cylinder axis desired for the lens wearer.

16. The process of claim 15, wherein the mold is a mold suitable for casting a progressive addition surface onto the preform.

17. The process of claim 15, wherein the optical preform cylinder axis is within about 0 to about 25 degrees of the lens' wearer's cylinder axis.

18. The process of claim 15, wherein the optical preform surface's near vision zone is located so that its center is along the 270 degree axis of the preform.

19. The process of claim 15, wherein the optical preform cylinder axis is provided is one of a group of about 20 possible axis orientations.

20. The process of claim 15, wherein the optical preform cylinder axis is provided at one of +11.25, +33.75, +56.25, +78.75, +101.25, +123.75, +146.25, or +168.75 degrees relative to the three o'clock position on the optical preform.

21. The process of claim 19 or 20, wherein the optical preform surface's near vision zone center is located along the 270 degree axis of the optical preform.

22. The process of claim 15, wherein the mold near vision zone is at a position that is on either side of the 270 degree axis of the mold.

23. The process of claim 22, wherein the near vision zone position is within about 0 to about 20 degrees of the 270 degree axis.

24. A process for producing a progressive addition lens for a lens wearer comprising the steps of: a.) providing an optical preform comprising a concave surface having a predetermined first cylinder axis that is within about 0 to about 25 degrees of the lens wearer's cylinder axis, a predetermined cylinder power and a predetermined first near vision zone position that is located so that the center of the near vision zone is along the 270 degree axis of the optical preform; b.) providing a mold for casting a progressive addition surface onto the optical preform's convex surface, the mold comprising a second near vision zone that is aligned with the lens wearer's near viewing pupil location; and c.) positioning the preform in relation to the mold in order to provide the resulting lens with a cylinder axis desired for the lens wearer.

25. The process of claim 24, wherein the predetermined first cylinder axis is within about 11 degrees of the lens wearer's cylinder axis.

26. The process of claim 24, wherein the optical preform cylinder axis is one of +11.25, +33.75, +56.25, +78.75, +101.25, +123.75, +146.25, or +168.75 relative to the three o'clock position on the optical preform.

27. The process of claim 26, wherein the predetermined first cylinder axis is within about 11 degrees of the lens wearer's cylinder axis.

28. The process of claim 24, wherein the mold near vision zone is at a position that is on either side of the 270 degree axis of the mold.

29. The process of claim 28, wherein the near vision zone position is within about 0 to about 20 degrees of the 270 degree axis.

30. A progressive addition lens produced by the process of claim 1.

31. A progressive addition lens produced by the process of claim 15.

32. A progressive addition lens produced by the process of claim 24.

* * * * *

UNITED STATES PATENT AND TRADEMARK OFFICE
CERTIFICATE OF CORRECTION

PATENT NO. : 6,123,422
DATED : September 26, 2000
INVENTOR(S) : Edgar V. Menezes, James S. Merritt, and William Kokonaski It is certified that error appears in the above-identified patent and that said Letters Patent are hereby corrected as shown below:

Claim 26, Column 12, Line 28, after "+168.75" insert -- degrees --

Signed and Sealed this

Fifteenth Day of May, 2001

*Attest:*

NICHOLAS P. GODICI

*Attesting Officer*   *Acting Director of the United States Patent and Trademark Office*